United States Patent [19]

Smith

[11] 4,245,458
[45] Jan. 20, 1981

[54] EXTENDABLE TOOL BAR FOR HAY RAKES

[76] Inventor: Howard Smith, 215 E. Amber Way, Hanford, Calif. 93230

[21] Appl. No.: 963,643

[22] Filed: Nov. 24, 1978

[51] Int. Cl.³ .......................................... A01D 77/06
[52] U.S. Cl. ................................ 56/376; 280/456 A; 280/412; 172/314; 172/451
[58] Field of Search ............... 172/456, 248, 451, 310, 172/446, 313, 311, 314, 776; 280/456 A, 411 R, 411 C, 412, 413; 56/377, 376

[56] References Cited

U.S. PATENT DOCUMENTS

| | | | |
|---|---|---|---|
| 429,437 | 6/1890 | Glass | 172/587 |
| 1,636,802 | 7/1927 | Bozard | 172/314 X |
| 1,721,694 | 7/1929 | Graham | 172/313 |
| 1,775,842 | 9/1930 | Berkler | 172/579 |
| 2,178,467 | 10/1939 | Brent | 172/314 |
| 2,605,599 | 8/1952 | Curry | 56/376 |
| 2,709,085 | 5/1955 | Stueland | 280/412 |
| 2,744,377 | 5/1956 | McCall | 56/376 |
| 3,077,722 | 2/1963 | Sadler | 56/377 |
| 3,093,394 | 6/1963 | McCollum | 172/248 X |
| 3,508,618 | 4/1970 | Walberg | 172/776 X |
| 3,568,423 | 3/1971 | Hale | 56/377 |
| 3,587,217 | 6/1971 | Harriot | 56/376 |
| 3,588,139 | 6/1971 | Bayne | 172/456 |
| 3,830,314 | 8/1974 | Aitkenhead | 172/776 |

Primary Examiner—Richard J. Johnson
Attorney, Agent, or Firm—Dowell & Dowell

[57] ABSTRACT

A transversely extendable tool bar for multiple hay rakes which is adapted to be mounted directly to the three-point hitch of a farm vehicle so that the gang of rakes mounted on the tool bar may be simultaneously lifted from or adjusted relative to the earth's surface.

1 Claim, 5 Drawing Figures

EXTENDABLE TOOL BAR FOR HAY RAKES

BACKGROUND OF THE INVENTION

1. Field of the Invention

This application is generally related to tool bars for mounting a plurality of hay rake implements to an earth-working vehicle and particularly to a telescoping tool bar having flanged mounting, or hitch plates, which are adapted to be secured to a conventional three-point hitch of a wheeled vehicle so that the entire assembly of hay rakes can be easily raised or lowered relative to the earth's surface.

2. Summary of the Invention

A tool bar assembly for selectively mounting a plurality of hay rakes to a farm vehicle in which the tool bar embodies a general hollow transverse beam in which at least two telescoping secondary beams are slidably disposed so as to be adjustable outwardly from the ends of the main beam. Mounting brackets are integrally attached generally centrally of the main beam and said brackets are adapted to be connected to the conventional three-point hitch of the farm vehicle. A plurality of gauge wheels are adjustably carried by the main beam to allow selective positioning of the working height of the rakes attached to the tool bar assembly.

It is the primary object of this invention to provide a tool bar which is particularly adapted for use with a plurality of hay rakes and which enable such rakes to be raised or lowered as a unit relative to the ground by the operation of the conventional three-point hydraulic hitch of a farm, or earth-working vehicle.

It is a further object of this invention to provide a tool bar which is designed to selectively receive at least two hay rakes and which is transversely extendable with respect to the direction of travel of the vehicle to which the tool bar is mounted to thereby permit selective spacing of the rakes relative to one another.

It is another object of the invention to provide a tool bar for supporting a plurality of hay rakes which bar can be mounted directly to the three-point hitch of a pulling vehicle and which includes transversely adjustable hitches which are designed to space at least one of the hay rakes forwardly of the other behind the pulling vehicle.

DESCRIPTION OF THE PREFERRED EMBODIMENT

Figures 1, 3:
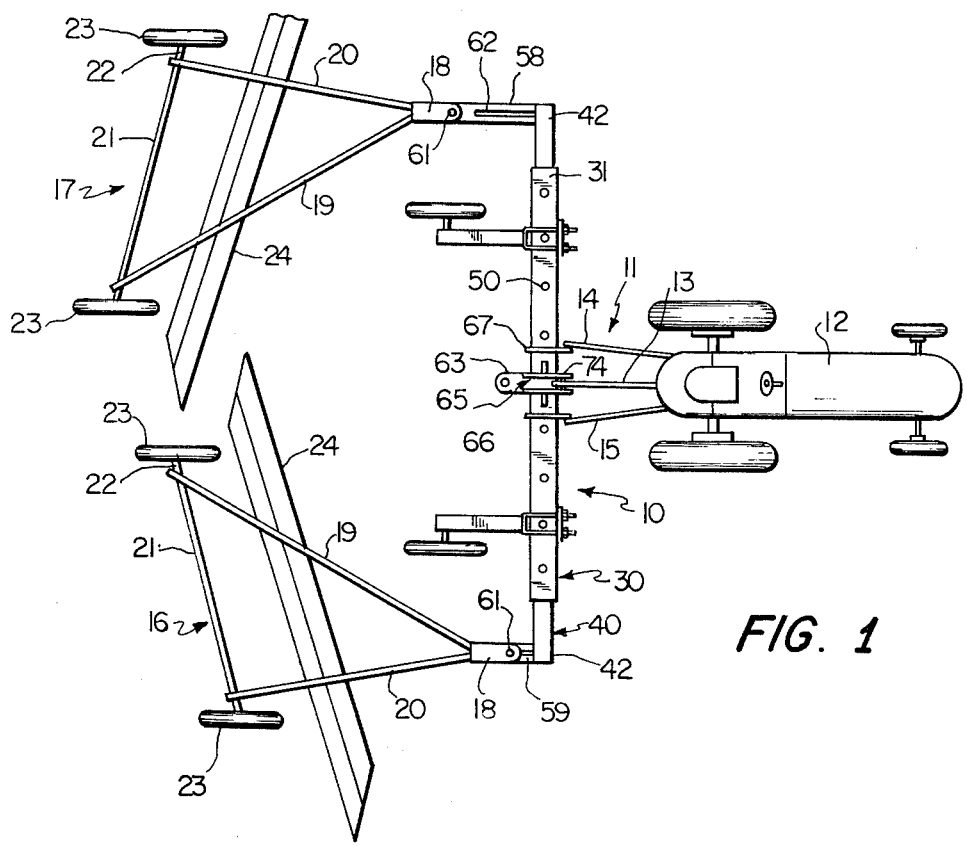
FIG. 1 is a top view illustrating the tool bar assembly of the present invention as used with a conventional tractor and conventional hay rakes.
FIG. 3 is a left plan view of the tool bar of the present invention.
Figure 2:
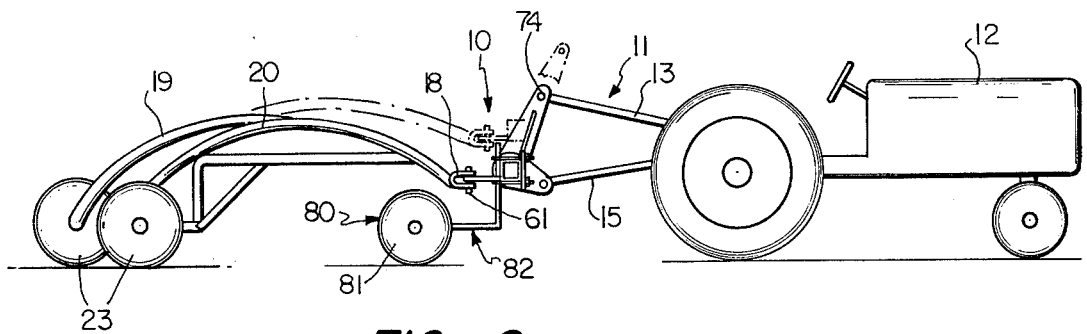
FIG. 2 is a left side view of the tool bar of the present invention illustrating its use with the three-point hitch of a conventional tractor which depicts in dotted lines the selective elevation of the hay rake implements by operation of the three-point hitch.

With continued reference to the drawings, the tool bar assembly 10 of the present invention is shown in FIGS. 1 and 2 as it is operatively connected to the three-point hitch 11 of a conventional farm tractor 12. The three-point hitch is also of a conventional construction and includes an upper follower arm or link 13 and a pair of spaced lower arms 14 and 15.

In operation, one or more hay rakes may be selectively attached to the tool bar assembly. In the drawings, a first hay rake assembly 16 is shown as being mounted to be slightly forwardly disposed relative to a second hay rake 17. The relative positioning of the rakes to one another may be varied to create differently desired windows. As shown, the two rakes will cause a simple windrow to be formed generally centrally along the route or path taken by the powering vehicle or tractor 12. Further, although only two rakes are shown, it is understood that additional implements could be provided for.

Each of the conventional hay rakes generally includes a hitch yoke 18, framing bars 19, 20 and 21, stub axles 22 and wheels 23. A raking mechanism 24 is shown as being diagonally mounted between the framing members 19 and 20 so as to cause material to be deflected or raked along a diagonal path and thereby be deposited laterally and to one side of each of the raking implements 16 and 17.

Figure 5:
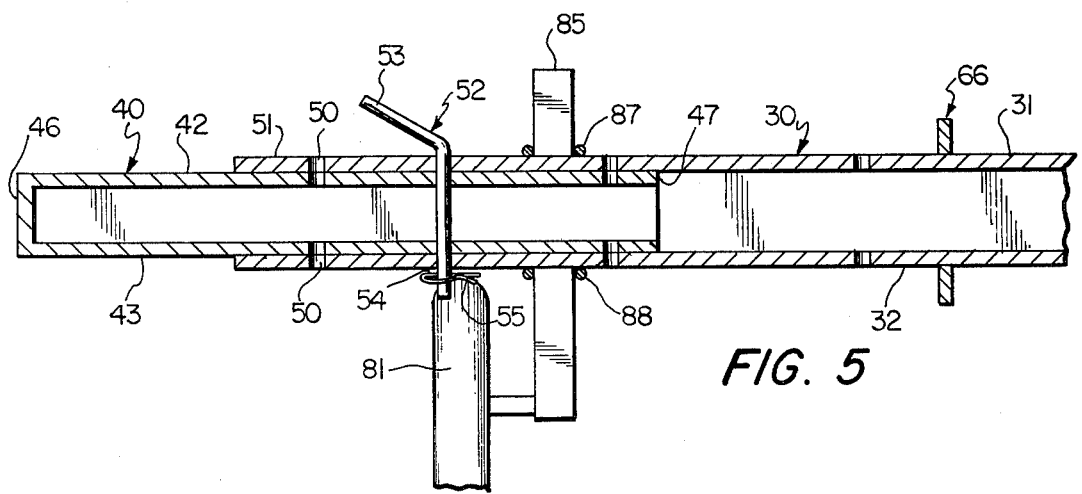
FIG. 5 is a section taken along lines 5—5 of FIG. 3.

With particular reference to FIGS. 3 and 5, the tool bar assembly 10 of present invention is shown in greater detail. The assembly includes a main tool bar frame 30 which is shown as being of a hollow box beam type construction having a generally square cross-section with top and bottom walls 31 and 32, respectively, front and back walls 33 and 34, respectively, and ends 35 and 36. It should be noted that the cross-sectional shapes of the main tool bar frame 30 may be other than square and could be rectangular, circular or some other configuration.

In order to increase the flexibility and range of use of the tool bar assembly, telescoping or extendable auxiliary tool bars 49 and 41 are slidably connected to either end of the hollow beam main tool bar frame 30 so as to be selectively adjustable outwardly from the ends 35 and 36 of the main frame 30, respectively.

It should also be noted that, although only a single auxiliary beam or bar 40 or 41 is shown as being disposed within or extendable from the ends of the main tool bar beam, it may be desirable in some instances to add or mount additional telescoping members within each of the auxiliary beams 40 and 41 so as to be selectively outwardly extendable therefrom. In this regard, the shape of the auxiliary beams 40 and 41 is shown as being of an open box beam construction of a square configuration which is complementary to the configuration of the main tool bar frame 30. Again, however, it is only necessary that the cross-sectional configuration of the auxiliary tool bars be compatible with the shape of the main tool bar frame and thus may be of some other cross-sectional design, or may be of a solid construction. As shown, however, each auxiliary bar includes an upper wall 42, lower wall 43, and forward and back walls 44 and 45, respectively.

Further, the outermost ends 46 of the auxiliary beams 40 and 41 are preferably covered or closed so as to prevent moisture or debris from being channeled into the hollow body of the main tool bar frame 30. The length of each auxiliary tool bar from its outermost end 46 to its inner end 47 should generally not exceed one-half of the length of the main tool bar frame so as to enable both auxiliary bar frames 40 and 41 to be selectively and substantially disposed or collapsed within the main frame 30.

To allow for the auxiliary beams 40 and 41 to be locked to the main frame in any one of a plurality of extended positions, a number of aligned spaced openings 50 are provided in the top and bottom walls 31 and 32 of the main tool bar frame 30. Similarly sized and aligned openings 51 are also provided through the upper and lower walls 42 and 43 of the auxiliary beams 40 and 41. When one of the openings 51 in auxiliary frames 40 and 41 is aligned with an opening 50 in the main frame, a locking pin 52 may be inserted through the opening to thereby prevent further sliding movement of the auxiliary frames related to the main frame. The locking pin 52 is shown as being of an L-shaped configuration and thus has a handle-like portion 53 which the equipment operation may grasp to create better leverage in placement and withdrawal of the pin. Further, an opening 54 is provided adjacent the other end of the pin through which a cotter pin 55 or similar element may be placed to prevent the pin 52 from being accidentally displaced from its locking position through the aligned openings in the main and auxiliary tool bar frame.

To enable the hay rake assemblies to be transversely spaced relative to one another behind a towing vehicle, outrigger hitches or tongues 58 and 59 are integrally welded or otherwise secured to the lower walls 42 and adjacent the outermost ends 46 of each of the auxiliary tool bar frames 40 and 41. Both hitches 58 and 59 extend rearwardly and each is provided with an opening 60 through which a connecting pin 61 may be disposed when the yoke hitch 18 of a hay rake is placed in alignment therewith.

To allow for one of the hay rake assemblies to be trailed slightly forwardly of another, the hitch plate 58 extends rearwardly of the auxiliary tool bar a greater distance than the hitch plate 59. As the stress on the joint (or weld) between hitch 58 and the auxiliary tool bar frame is increased due to the increased length, an elongated upstanding reinforcing flange 62 is welded or otherwise secured to both the hitch plate 58 and the back wall 45 of the auxiliary tool bar frame. A third hitch tongue 63 is also shown as extending rearwardly from a generally central point along the length of the bottom wall 32 of the main tool bar frame 30. This third or central hitch may be used for single file towing of two hay rakes behind a tractor.

Figure 4:
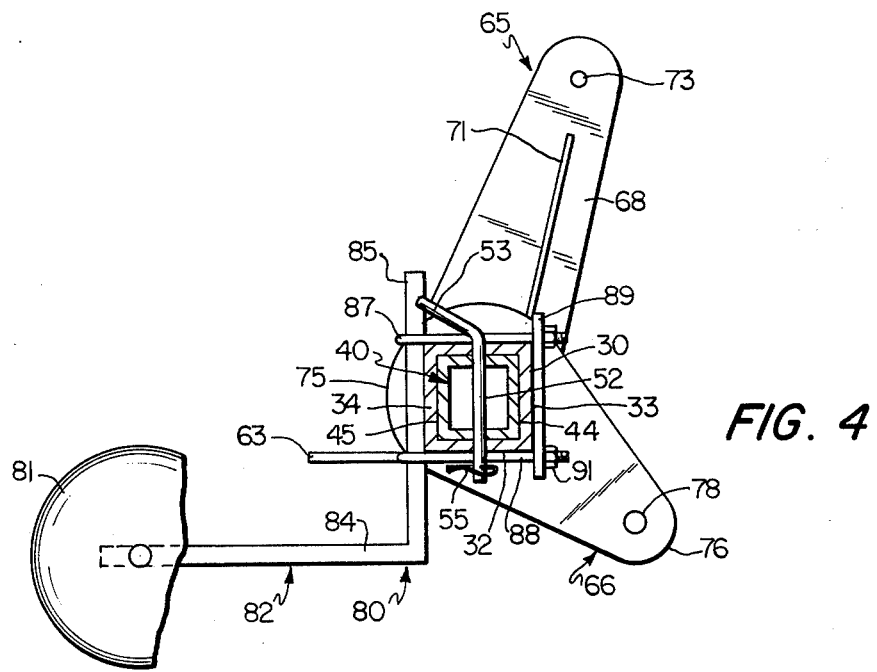
FIG. 4 is a section taken along lines 4—4 of FIG. 3.

In order to utilize the conventional three-point hitch 11 of the pulling vehicle 12 to operably lift or shift the hay rakes, the tool bar assembly 10 is constructed so that it may be connected directly to the three-point hitch. With particular reference to FIGS. 4 and 5, the mounting members which are provided for direct connection to a conventional three-point hitch include an upwardly directed yoke-type mounting bracket 65 and a pair of spaced generally forwardly and downwardly directed flanged mounting plates 66 and 67. The yoke mounting bracket 65 is shown as being positioned generally centrally along the length of the main frame and includes a pair of spaced parallel plates 68 and 69 which are notched at their base so as to be welded or otherwise secured to the front 33, top 31, and back 34 walls of the main frame. A spacer element 70 is provided between the plates 68 and 69 and is secured thereto to insure proper spacing of the plates as well as to increase the strength of the mounting bracket 65. For added strength, a flanged reenforcing element 71 is welded to each of the plates 68 and 69 and to the top wall 31 of the main frame. A pair of aligned holes 73 are provided through the upper portion of each of the plates 68 and 69 so as to selectively receive a locking pin 75 which is inserted therethrough to lock the upper arm 13 of the three-point hitch between the plates 68 and 69.

Each of the flanged mounting plates 66 and 67 is shown as being equally spaced along either side of the central mounting bracket 65 and includes a base portion 75 which is disposed about the main tool bar frame and welded thereto. The nose or leading portion 76 of the plates 66 and 67 is directed downwardly and forwardly of the front wall 33 of the main tool bar frame 30. In order to mount the spaced lower arms 14 and 15 of the three-point hitch 11 to mounting plates 66 and 67, respectively, a mounting stud or rod 78 is disposed through and fixed to the nose portion of the plates. When it is desired to mount the spaced lower arms of the three-point hitch to the mounting plates, the ends of the lower arms are placed over the mounting studs and thereafter a nut, cotter pin or other locking device (not shown) is secured to the stud 78.

The tool bar assembly 10 is also provided with gauge wheel assemblies 80 which can be adjusted so as to enable the tool bar assembly and hay rake to follow the contour of the surface over which they are trailered or towed. Each gauge wheel assembly 80 includes a gauge wheel 81 which is rotatably mounted to an L-shaped support bar 82 by means of stub axle 83. The L-shaped support bars include a first portion 84 which is disposed rearwardly of the main tool bar beam 30 and an upright members 85 which is secured by a double bracket assembly 86 to the main tool bar frame.

The bracket assemblies include upper and lower U-shaped bolts 87 and 88 which are positioned around the upright members and over and under the main tool bar frame 30. A clamping plate 89 is provided and includes a plurality of openings therein throughwhich the threaded ends of the bolts 87 and 88 are disposed. Locking nuts 91 are subsequently tightened along the threaded portion of the locking bolts to draw the clamping plate against the front wall 33 of the main frame as the upright 85 of the L-shaped gauge wheel support bar is drawn against the rear wall 34 of the main frame.

In the use of the tool bar assembly of the present invention, either a single or plural hay rake may be mounted to the tool bar. First, the tool bar assembly is attached to the three-point hitch of a tractor or similar vehicle. The upper follower arm 13 of the three-point hitch is positioned between the mounting bracket plates 68 and 69 afterwhich a locking pin 74 is inserted through the aligned openings in the brackets and follower arm to thereby lock the arm in position.

Next, the spaced lower arms 14 and 15 are positioned about the pins 78 disposed through the nose portion 76 of the mounting plates 66 and 67, respectively. Thereafter the arms 14 and 15 are secured in position. As the tool bar assembly is now mounted directly to the three-point hitch of the vehicle, the assembly may be raised, lowered, or otherwise manipulated by control of the three-point hitch.

After the tool bar assembly 10 has been mounted to the three-point hitch, the number of hay rakes and their relative positioning behind the tool bar are determined. The lateral placement or positioning of the rakes may be selectively adjusted by removing the locking pins 52 from the aligned openings 50 and 51 through the main and auxiliary frames, respectively. The auxiliary beams or frames may then be extended outwardly or positioned inwardly to the desired degree. As the opening 51 in the auxiliary frame is again aligned with an opening 50 in the main frame, the pin 52 is reinserted and the cotter pin 55 placed through the opening 54 to thereby lock the auxiliary frames to the main frame. If further adjustment of the main and auxiliary tool bar height is required, the gauge wheel assemblies 80 may be adjusted by lossening the clamping plates and sliding the support bar 81 relative to the main frame 30.

With the transverse spacing of the outrigger hitches or tongues 58 and 59 accomplished, the hay rakes may now be attached thereto. As the hitch 58 is longer than the hitch 59, the relative trailing position of the rakes is staggered to assist in the windrowing operation.

As the hay rakes are pulled through the field and it becomes necessary to turn the vehicle to begin another row, or when any large obstacle is in the path of the hay rakes, the driver need only operate the lift mechanism for the three-point hitch to raise the tool bar assembly and thereby lift the hay rakes 24 relative to the earth's surface. Such selective lifting and lowering of the rakes will not only protect the rakes but will also prevent damage to adjacent crops, irrigation equipment and other structures.

It should be noted that as the tool bar assembly 10 is raised, the front of the hay rake frame is raised as the rear portion thereof is pivoted about the axle of the wheels and thus the wheels remain in contact with the ground as the tines of the rakes 24 are raised relative to the ground.

I claim:

1. The combination of a tool bar and a pair of raking implements comprising an adjustable tool bar apparatus which is selectively connected to a propelling vehicle having a three-point mast hitch and a pair of hay rakes, each of said hay rakes having a frame mounted on an axle and wheel assembly and extending forwardly therefrom toward said tool bar apparatus, raking means mounted forwardly of said axle and wheel assembly and hitch means extending from said frame means, said adjustable tool bar apparatus having an elongated hollow main tool bar having a bore which is non-circular in cross-section, said main tool bar being disposed generally normal to the path of travel of the vehicle, first and second auxiliary tool bars telescopically received within said bore at opposite ends of said main tool bar, each of said auxiliary tool bars having an external configuration generally complementary to the bore of said main tool bar, means for attaching said auxiliary tool bars to said main tool bar in fixed adjusted position, said first auxiliary tool bar having a first tool bar tongue fixed thereto adjacent to the outer end and extending rearwardly relative to the vehicle a predetermined distance, said second auxiliary tool bar having a second tool bar tongue of a second length which is greater than the length of said first tool bar tongue, means on each tool bar tongue for attaching one of said hay rake hitch means thereto, at least one upwardly extending bracket mounted on said main tool bar, said bracket having means for selectively receiving the upper arm of the mast hitch, a pair of spaced mounting members mounted on said main tool bar on opposite sides of said bracket and extending generally forwardly thereof, said mounting members having means for selectively receiving the lower arms of the mast hitch, gauge wheels means mounted on said main tool bar so as to extend downwardly and rearwardly of said hollow main tool bar and forwardly of said raking means of said hay rakes, whereby said hay rakes connected to said first and second tool bar tongues will be longitudinally spaced with respect to the line of movement of the propelling vehicle selectively transversely adjustable with respect to one another and selectively adjustable vertically as said raking means is selectively elevated with respect to the earth's surface as the three-point hitch of the propelling vehicle is raised pivoting said hay rake frames about said axle and wheel assemblies.

* * * * *